A. H. SCHMEDTJE.
RECEPTACLE.
APPLICATION FILED MAR. 3, 1913.
1,147,192.
Patented July 20, 1915.
6 SHEETS—SHEET 1.
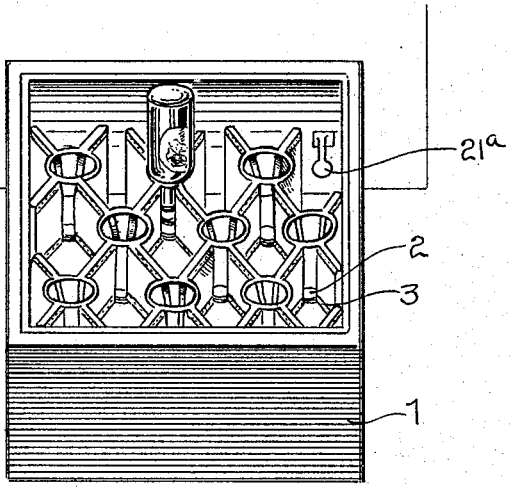
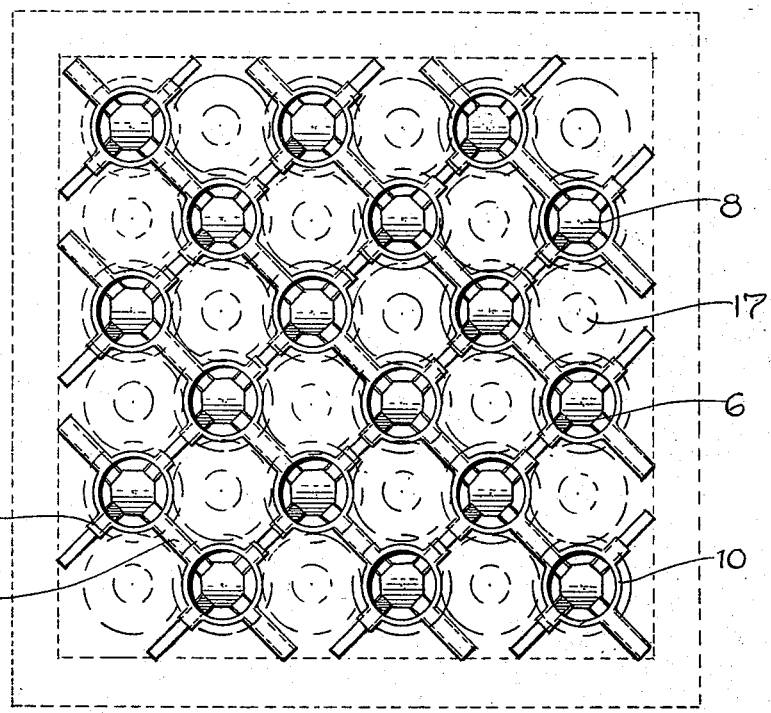
Witnesses
Robert M. Sutphen
A. J. Hind
Inventor
ADOLPH H. SCHMEDTJE
By Frederick S. Stitt
Attorney

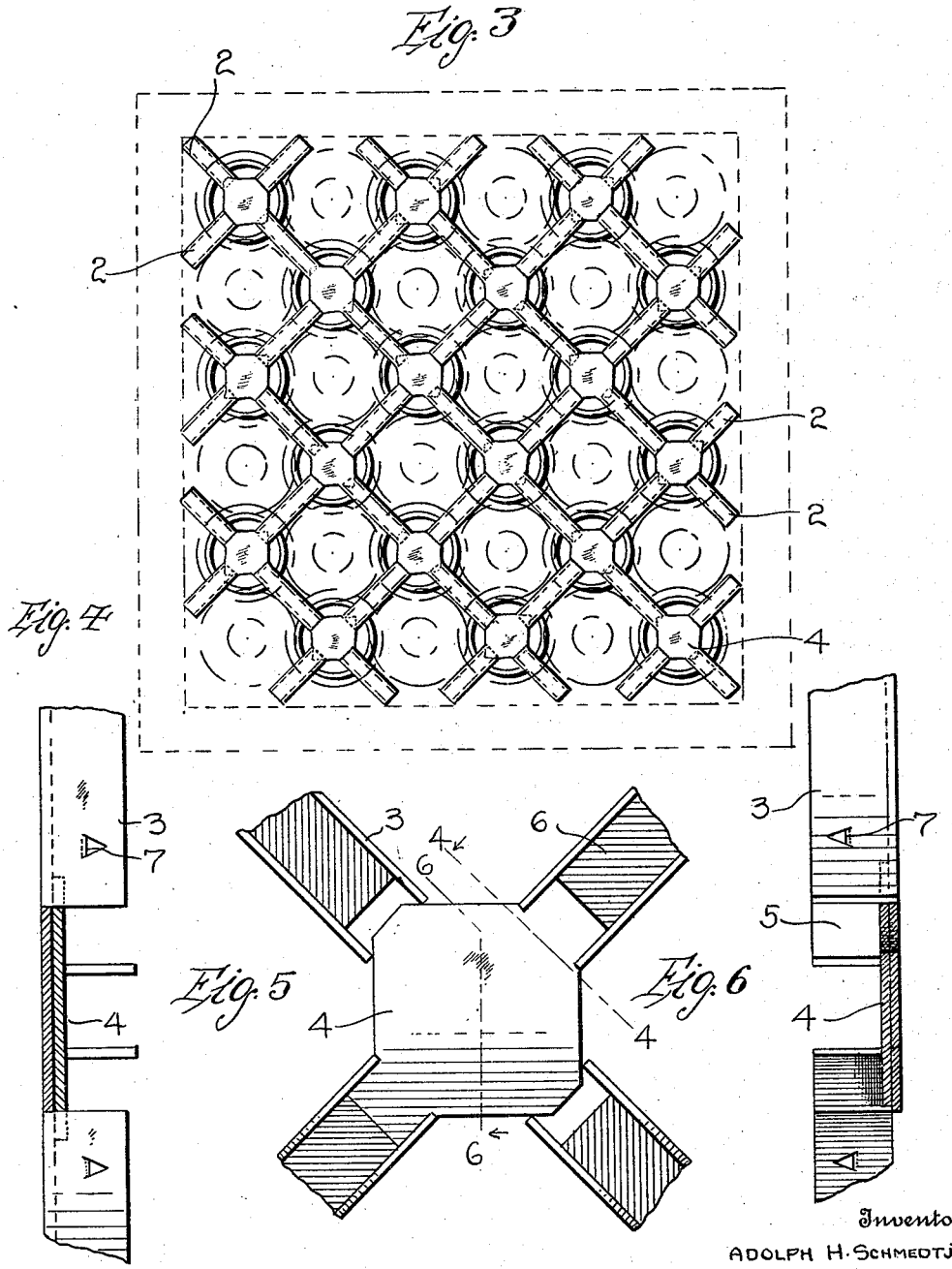

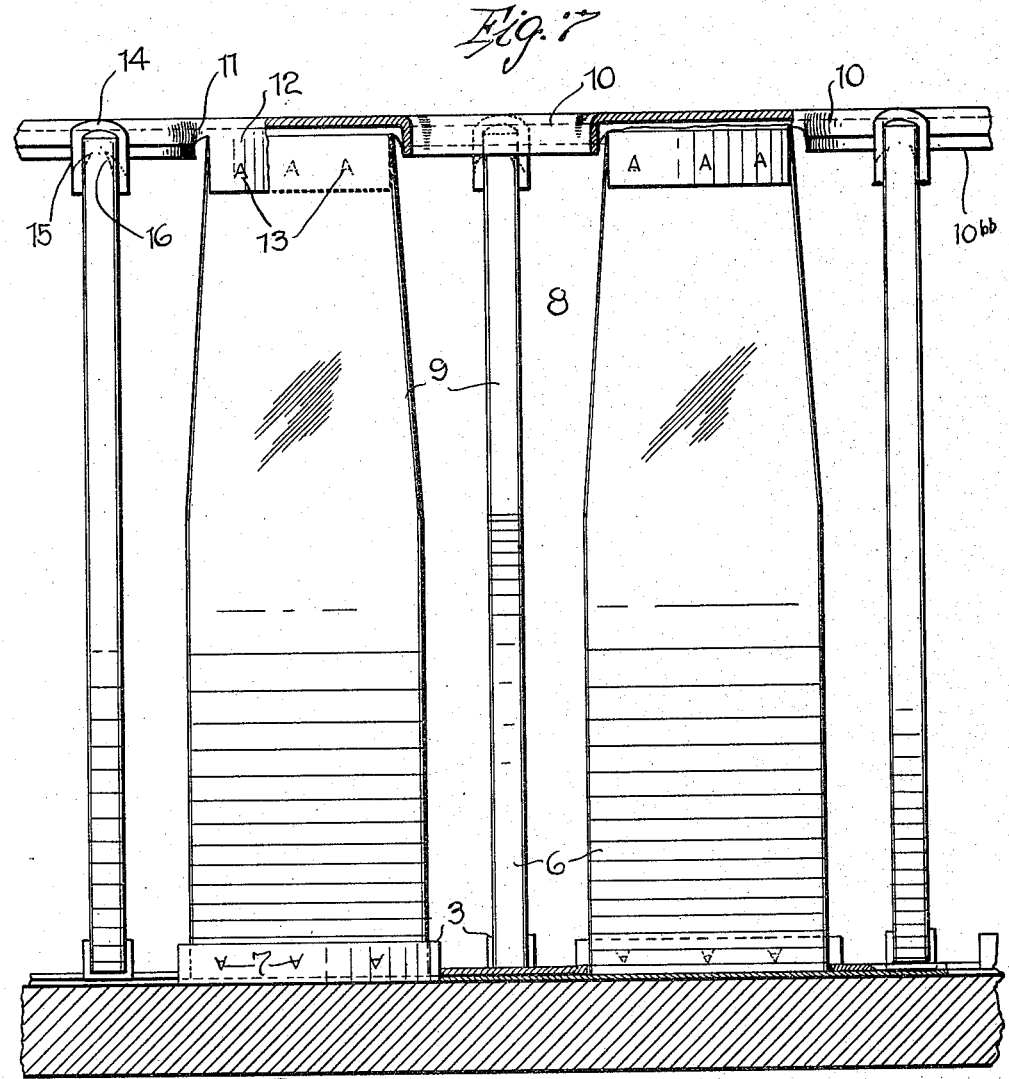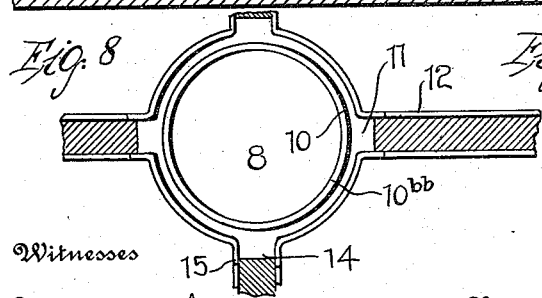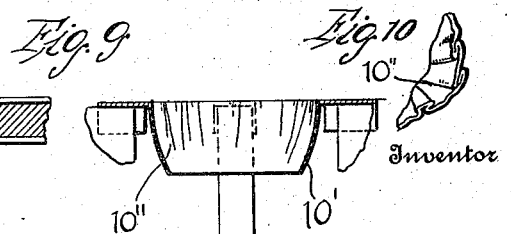

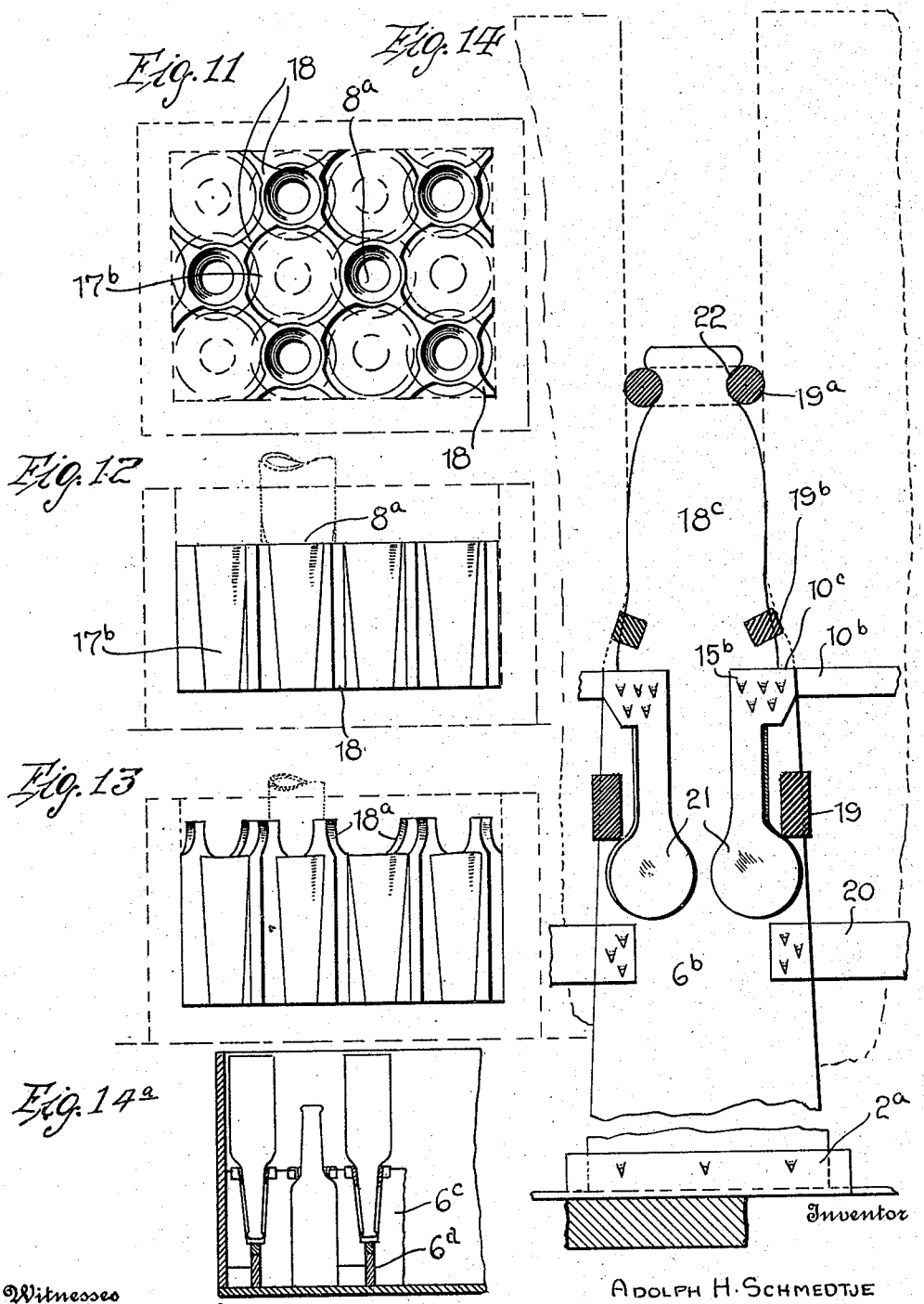

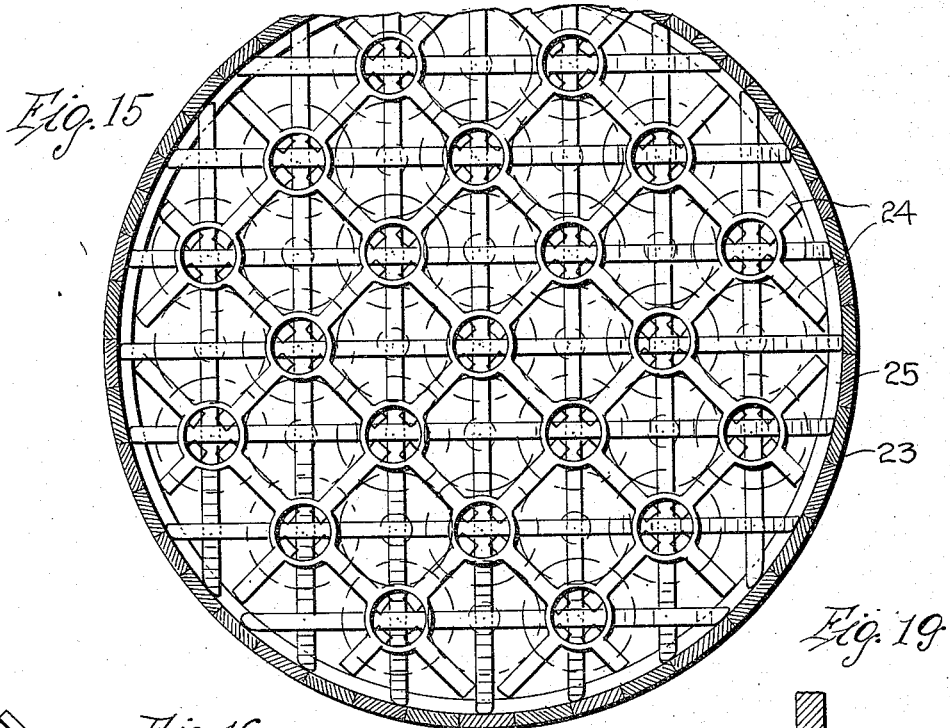
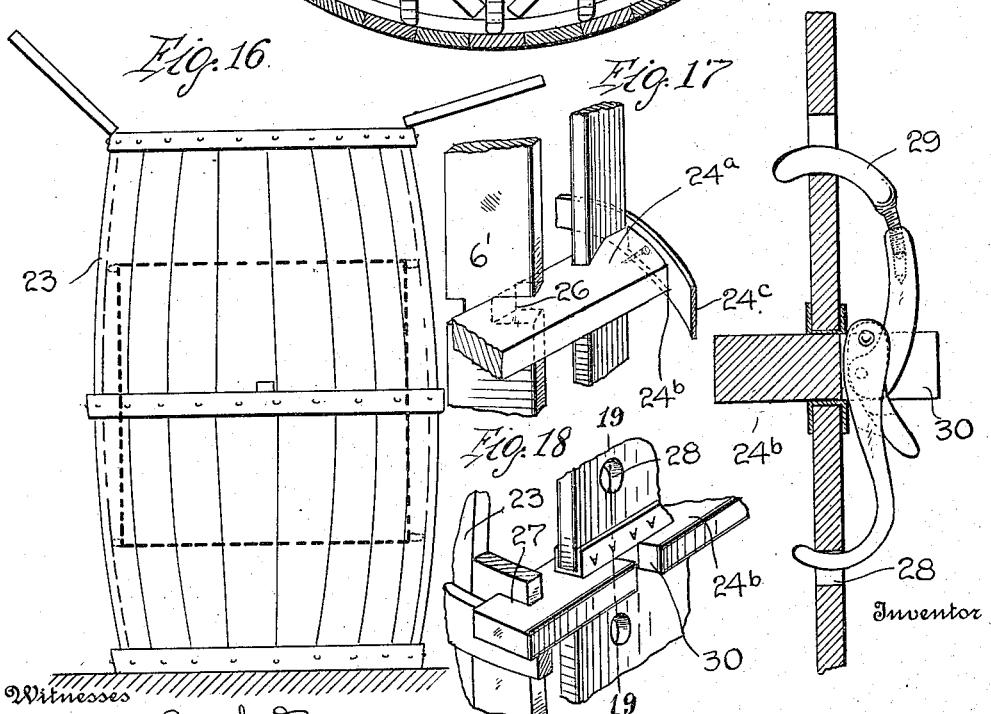

A. H. SCHMEDTJE.
RECEPTACLE.
APPLICATION FILED MAR. 3, 1913.
1,147,192.
Patented July 20, 1915.
6 SHEETS—SHEET 6.
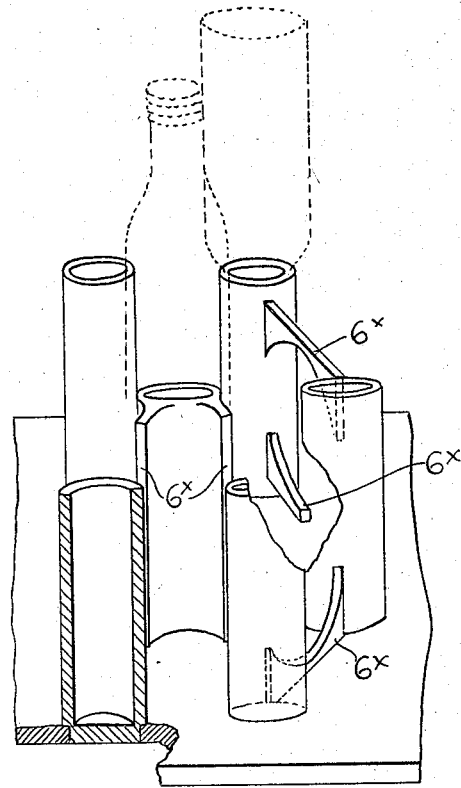
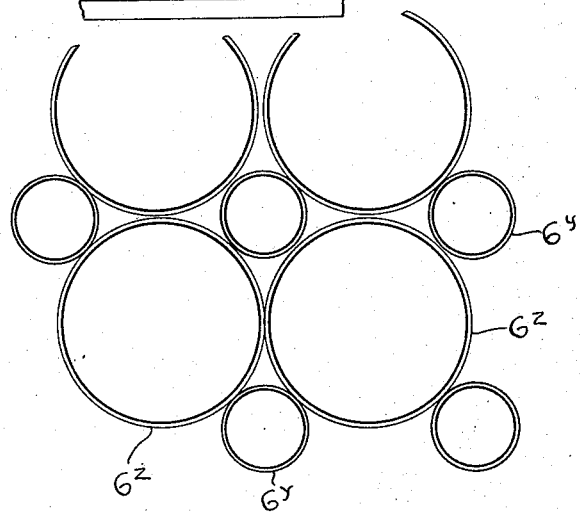
Inventor
ADOLPH H. SCHMEDTJE
Witnesses
Robert M. Sutphen
A. J. Hind
By Frederick S. Pitt
Attorney

UNITED STATES PATENT OFFICE.

ADOLPH H. SCHMEDTJE, OF ST. LOUIS, MISSOURI, ASSIGNOR TO SANO MANUFACTURING CO., OF ST. LOUIS, MISSOURI, A CORPORATION OF MISSOURI.

RECEPTACLE.

1,147,192. Specification of Letters Patent. Patented July 20, 1915.

Application filed March 3, 1913. Serial No. 751,794.

*To all whom it may concern:*

Be it known that I, ADOLPH H. SCHMEDTJE, a citizen of the United States, residing at St. Louis, in the State of Missouri, have invented certain new and useful Improvements in Receptacles, of which the following is a specification.

This invention comprehends certain new and useful improvements in shipping and storing receptacles and relates particularly to crates, cases or barrels for use in holding bottles.

The present invention is in part a continuation of my application for patent on improvements in shipping cases and barrels for bottles and the like, filed on or about the 21st day of November, 1910, Serial No. 593,573.

The primary object of the present invention is to provide nesting means for bottles or similarly shaped articles, in shipping boxes or barrels in such a way that the greatest possible space is utilized and at the same time the nesting means is so arranged that the bottles can be placed into or removed from the same without disturbing it or removing part of it, said nesting device comprising two series pockets, the one series of pockets to receive the body portions of bottles in upright position and the other series of pockets to receive the neck portions of bottles in inverted position, the centers of the first series of pockets lying in lines preferably rectangular to one another, and the second series of pockets lying at the intersection of lines drawn through the centers of the first mentioned pockets, the width or diameter of the first mentioned pockets to be somewhat larger than the diameters of the bottles they are to receive, and the other series of pockets to be large enough to receive the neck portions of the bottles, each bottle being held by the nesting means independent of all of the other bottles. This nesting means may have walls made of paper, wood or metal or other suitable material or any combination thereof to form the two series of pockets. This invention covers several structures, as will be hereinafter more fully understood, all bearing similarity to one another, all embodying substantially the same principles and all attaining the same end.

The invention also has for its object a device of the character set forth in the preceding paragraph, by the use of which space may be materially economized and the resultant advantages in handling, in storing and in shipping secured, with the consequent reduction in rates, in connection with the matter of shipping.

The present embodiment of the invention is designed particularly for use as a receptacle for holding beer bottles, although it is to be understood that the invention is not limited to this use, but is equally applicable for holding other bottles and similarly shaped articles, whereby a maximum nesting effect may be secured, while at the same time, the characteristic of securely holding the articles to prevent breakage will not be detracted from in any wise.

A further object of the invention is a simple, durable and efficient construction and arrangement of bottle supporting members, whereby not only will space be economized to a marked degree, but the device will remain undisturbed during the removal or replacement of any or all of the bottles, which may be done with practically the same facility as in a case of the ordinary proportions, which latter would require considerably more room or space than a receptacle constructed in accordance with the principles of my invention.

A still further object of the present invention is a provision of a simple, strong and compact frame-work which may be easily manufactured and produced as a separate structure or entity capable of being either permanently or detachably disposed within an outer receptacle or container of any desired formation or design without necessarily entering into or being dependent upon the construction of such container, whereby said frame-work which embodies a plurality of pockets capable of receiving the bodies of bottles and an associate plurality of pockets capable of receiving the necks or shoulder portions of other bottles with the latter in inverted position with respect to the first mentioned bottles may be sold or licensed for use in connection with different makes or designs of containers. If desired, the rack or framework just before mentioned may be sold in knocked-down form, the parts being capable of being readily assembled by the use of small tools, the interlacing and interlocking of the bottom strips hereinafter described providing a sufficiently rigid construction, and making the use of solder or other fastening means unnecessary in this form of my invention. And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter fully describe and claim.

For a further understanding of the invention, reference is to be had to the following description and accompanying drawings, in which, Figure 1 is a front view looking from above into a box designed to hold one and one-half dozen bottles, showing therein a rack constituting one form or embodiment of my invention, with integral ring supports. Fig. 2 is a top plan view of a rack for three dozen bottles, showing ring supports connected in strips. Fig. 3 is a bottom plan view of the rack shown in Fig. 2. Fig. 4 is an enlarged detail view partly in section, the section being taken on the line 4—4, of Fig. 5. Fig. 5 is an enlarged detail top plan view of intersecting bottom partition strips. Fig. 6 is an enlarged detail view partly in section on the line 6—6, of Fig. 5. Fig. 7 is an elevation, partly in section, of the bottle-receiving rack. Fig. 8 is a bottom view of one of the supporting rings at the top of said rack. Fig. 9 is a transverse sectional view of another form of supporting ring. Fig. 10 is a detail view showing the folds or crimped edge of the ring illustrated in Fig. 9. Fig. 11 is a top plan view of another form of the rack. Fig. 12 is an elevation of the rack shown in Fig. 11. Fig. 13 is an elevation illustrating a modification of that form of the invention which is illustrated in Figs. 11 and 12. Fig. 14 is an enlarged detail view of a portion of a post, post extension, supporting rings, reinforcing rings, spring members, buffer members, and bottom supporting strip. Fig. 14ª is a vertical sectional elevation of the type of rack set forth in my copending application above referred to. Fig. 15 is a top plan view of another embodiment of my invention designed for use in a barrel, this form being an integral double rack. Fig. 16 is an elevation of a barrel showing in dotted lines the position occupied therein by the rack shown in Fig. 15. Fig. 17 is a fragmentary perspective view of a modified form of joining and supporting member for the double barrel rack. Fig. 18 is a fragmentary view showing a pair of single racks placed bottom to bottom against an intervening supporting member. Fig. 19 is an enlarged sectional view on the line 19—19, of Fig. 18, showing a clamping device hereinafter specifically referred to. Fig. 20 is a perspective view of another modification, and, Fig. 21 is a plan view of still another modification.

Corresponding and like parts are referred to in the following description and designated in the accompanying drawings by like reference characters.

In that embodiment of my invention illustrated in Figs. 1 to 8, my improved bottle holding case 1 includes a base frame which is composed of a plurality of preferably metallic strips 2 of the required or predetermined length and width, arranged parallel to each other and intersected by a plurality of corresponding strips disposed parallel to each other and at right angles to the first named strips. The strips 2 may be secured together in any desired way, preferably by interlacing, as clearly indicated in the drawings, and they have upstanding longitudinally extending side flanges 3 that are interrupted at the points of intersection. In the preferred manner of securing the strips together, they are formed with quadrangular bracing members 4, and they may be interlaced, the corners of said members in the upper strip engaging the side flanges of the under strip, or they may be soldered or otherwise secured to each other at the points of intersection.

The channels 5 that are formed by the side flanges 3 of the strips 2 are designed to receive the lower edges of the partition members or posts 6, secured in any desired way within said channels, as by spurs or tangs 7 which are punched inwardly from the side flanges 3 and engaged or partially embedded in the side faces of the posts at or near the lower edges of the latter. The edges of the posts 6 terminate with, or short of, the spaces that are produced between the adjoining ends of the longitudinally adjacent flanges, as clearly illustrated in the drawings (although the invention is not limited in this regard), and produce pockets 8 which are designed to receive and accommodate and if desired have their vertical walls directly engage and support the necks of the bottles that are disposed within the case in an inverted position. These pockets 8 may be more or less downwardly tapered, as desired, by beveling the adjacent edges of the posts 6, as indicated at 9, so as to conform to any desired extent with the general and longitudinal outline of the bottle necks, and the upper ends of the posts, in that embodiment of the invention which I am now describing, may be bridged around the walls of each of the pockets 8 by bottle supporting members 10 that are in the form of rings. These rings are preferably arranged in series with two or more rings of each series connected together by webs 11 which are provided with side flanges 12 extending down over and embracing the upper ends of the posts, as shown, and secured thereto in any desired way, as by inwardly punched spurs or tangs 13. In addition to the connecting webs 11, the supporting members or rings 10 are formed with laterally disposed extension webs 14 which are also flanged, as indicated at 15, and which extend over the upper ends of those posts which are not embraced by the flanged webs 11, before referred to, the flanges 15 in the present instance being secured to their embraced posts by inwardly punched tangs 16, corresponding to the tangs 13 and 7.

As above set forth, the pockets 8 are designed to receive the necks of bottles held in an inverted position. Instead of the continuous webs 11, the rings 10 may be formed with four of the extension webs 14 and thus be independent units. The rings 10, it is to be understood are formed with an overturned upper edge, as clearly illustrated at $10^{bb}$ in Figs. 7 and 8, so as to prevent the tearing or marring of the wrappings, labels, or pasters on the top portions of the bottles, and the other metal parts hereinafter described are also provided with rounded or overturned edges for similar purposes.

It is to be understood that the rings may be of various constructions and forms. One modification thereof is illustrated in Figs. 9 and 10 by reference to which, it will be noted that the rings, there designated 10', are formed with folds or crimps 10''.

The adjoining faces of the posts 6 form pockets 17 which are designed to receive and accommodate the body portions of bottles disposed in an upright position with their necks pointed upward, the last named pockets being preferably of a size, transversely considered, approximating a slight margin over the greatest exterior diameter of the bottles which they are designed to receive.

From as much of the description as has preceded in connection with the correlated views of the accompanying drawings, it will be understood that I have provided a receptacle, or considered in one aspect, a partitioned frame-work for a receptacle, which includes a plurality of pockets designed to receive the body portions of bottles disposed upright and an alternating series of preferably tapering pockets designed to receive the necks of bottles held in an inverted position, and that in the embodiment of the invention hereinbefore referred to in detail, the said partitioned frame-work includes a base frame composed of a plurality of partition strips arranged in intersecting relation to each other and a plurality of vertically disposed posts or partition members which are supported on said base frame in such relation to one another that the side faces of the posts will form pockets to receive the bodies of bottles and the adjoining edges of the posts will form pockets for the reception of the necks of bottles held in an inverted position.

The embodiment of my invention hereinbefore described does not confine or limit the scope of the invention, for it is to be understood that such embodiment is primarily included herein for the purpose of illustrating one of the many forms in which my invention may be carried out; and it is to be further understood that various changes may be made in the construction, arrangement and proportions of the parts without departing from the scope of the invention, as defined in the appended claims. Thus, the mere arrangement of the racks sidewise instead of vertically, is considered a part of this invention, which it is deemed unnecessary to separately describe.

The two sides of compartments or pockets, that is, one set for the body portions of the bottles and the other set for the neck portions thereof, may be produced by the intersecting of vertically disposed walls formed out of papier mâché or some similar substance, or of metal, and capable of being molded or pressed into shape, an example of such modification being illustrated in Figs. 11 and 12. In this embodiment of the device, there are vertically disposed and horizontally extending webs 18 arranged parallel to each other in spaced relation and at right angles to a corresponding series of parallel webs, the frame-work thus produced being formed at the points of intersection of the two sides of webs with pockets $8^a$ which are preferably in the shape of a truncated inverted cone, these pockets being designed to receive the necks of inverted bottles and the space between the adjacent side faces of the adjoining webs producing pockets $17^b$ for the reception of the body portions of the bottles in an upright position. It is to be understood that this form of the invention may, if desired, be constructed with upward extensions $18^a$, as shown in Fig. 13, projecting upward to a height and of such shape or configuration that the pockets for the necks of the bottles in inverted position will not only receive or accommodate the necks, but will have their walls directly in contact with the necks and the adjoining portions of the bodies so as to securely hold and support the inverted bottles as against accidental tilting movement or displacement.

With a view to providing a box or crate designed for use particularly in export trade or wherever an extra rigid frame is desirable, as for example, for use in the transportation of large thin walled bottles or those in a measure unusually fragile, I have provided the embodiment illustrated in Fig. 14 wherein the posts $6^b$ may be supplied with cushions 19 at their edges which are in contact with the necks of the bottles in inverted position, said posts being connected together intermediate of their upper and lower ends at any predetermined point by rings 20 which serve to strengthen or brace the frame. Moreover, the posts 6<sup>b</sup>, it will be seen, are provided at their tops with supporting rings 10<sup>b</sup>, said last named rings having relatively short web portions 10<sup>c</sup> seated upon the upper edges of the post proper, said web portions being formed with ears 15<sup>b</sup> which preferably have the same extent of contact with the faces of the posts as the ears or flanges 15 hereinbefore described, and they preferably also have spring members or tongues 21 produced by offset portions, said tongues being designed to directly engage the body portions of the bottles that are inserted in these pockets that are designed to receive bottles in upright position, whereby all rattling of these bottles will be prevented and liability of breakage from lateral shock will be precluded, the bottles that are held in upright position with their necks pointing upward being securely held in position by these tongues which, however, do not present any appreciable resistance to a free withdrawal or removal of said bottles. The posts of this embodiment of the invention are formed with upward extensions 18<sup>c</sup> having functions similar to those of the parts 18<sup>a</sup> hereinbefore described and illustrated in Fig. 13, although they may differ in construction by being formed with notches 22 near their top in which buffers 19<sup>a</sup> preferably of rubber, are seated and held. The post extensions in this embodiment of the device preferably terminate approximately midway of the body portions of the inverted bottles. The buffers 19<sup>a</sup> assist in holding the inverted bottles firmly and yet with sufficient yielding action to absorb ordinary shocks and thereby assist in protecting the bottles from breakage. Buffers 19<sup>b</sup> are provided near the base of the post extensions similar to the buffers 19 and serving to engage the shoulder portions of the inverted bottles.

If desired, spring members or tongues 21<sup>a</sup> like the spring tongues 21 hereinbefore referred to and illustrated in Fig. 14 may be fixed to the sides, top or bottom of the inclosing receptacle opposite to the bottom compartments of the rack or frame to resiliently engage the adjacent bottles and hold them against sliding movement and to protect them from sudden shock. It is, of course, to be understood that the posts of the embodiment of the invention illustrated in Fig. 14 are preferably connected at their lower ends to flanged strips 2<sup>a</sup> like the strips 2 hereinbefore described.

In Fig. 14<sup>a</sup>, I have shown an embodiment of my invention set forth in my copending application heretofore mentioned. It will be understood that the improvements above described may form a part of a rack of this type, the supports 6<sup>c</sup> and bottom strips 6<sup>d</sup> of which are made integral.

In that form of my invention illustrated in Figs. 15 to 19, the receptacle is in the form of a barrel designated 23, and the rack is disposed within the barrel in the position indicated by dotted lines in Fig. 16. This rack is an integral double rack receiving and supporting two inner sets of bottles with their bottoms or bases together and two outer sets of bottles, each of which is in inverted position relatively to its adjacent inner set, said rack being built up of posts connected by keyed or mortised cross bars 24 (see Fig. 15) at right angles to each other, the ends of the cross bars being secured to annular seats 25 in any desired way and said seats being secured within the barrel in any desired manner. It will be understood that this embodiment of the invention includes two sets of pockets for each half of the double rack, the one set of pockets to receive the body portions of the bottles, and the other set preferably tapering to receive the necks of the bottles which are in inverted position relatively to the first mentioned bottles.

Fig. 17 illustrates substantially the same arrangement as that illustrated in Figs. 15 and 16 except that there is only one set of cross bars, designated 24<sup>a</sup>, all parallel to each other and engaging with transverse notches 26 provided centrally in the vertical edges of the posts, here designated 6', all except the outer posts being provided with the said notches on each of their vertical edges, as shown in Fig. 17, and being engaged and held by two of the said parallel cross bars. The cross bars may be fixed to seats or may pass through holes in the side of the barrel, but it is preferred to terminate them flush with the outer series of posts, as shown at 24<sup>b</sup> in Fig. 17 where they are fastened by means of screws to a band or hoop preferably of metal 24<sup>c</sup> which tightly surrounds the rack at its central portion. In the latter case, the rack is held in fixed position in the barrel by means of screws or nails driven through the side of the barrel into the adjacent circumferential posts. All the features hereinbefore described except the flanged bottom strips may be embodied in the above described double racks.

In that form of the invention illustrated in Figs. 18 and 19, any two of the single rack structures above described may be converted into a double barrel rack and no special form of barrel is required. Openings 27 are formed in the barrel 23 and one or more of the cross bars 24<sup>b</sup> inserted therein. Holes 28 are cut in those end posts of the rack which have no adjacent bottle compartments and adjustable clamping hooks 29 are applied, a notch 30 being cut in the cross bar between adjacent holes 28 in superposed and inverted racks and the clamps being snapped into self-locking position, as clearly illustrated in Fig. 19.

It will be noted, the operation of filling a barrel equipped with a centrally fixed double rack involves the filling of one side with a set of bottles in upright position and then with a set of bottles in inverted position, after which, the top of the barrel is closed and the entire barrel inverted. The side which is then on top is filled in the same way as the other and that end of the barrel closed. Upon the inverting of the barrel the shoulder portions of first two sets of bottles engage with very slight movement, and the said bottles are held by the container and the posts securely in their respective compartments.

Fig. 20 is intended to illustrate the fact that the webs between the pockets for the bottles in inverted position may be either partially or entirely done away with. In this modification, only pockets for receiving the neck portions of bottles are formed, these pockets being arranged, as clearly illustrated in Fig. 20, at the cross section of lines drawn through the center of the pockets or intervening spaces that are designed to receive the bottles in upright position. In this form, the webs between the pockets, said webs being designated $6^x$, are either partially or entirely done away with, and may be entirely omitted, if desired.

In Fig. 21, the pockets designated $6^y$, may be of any desired construction or arrangement and formed in any desired way as individual elements or units and may be connected together by intervening hoop-like braces $6^z$ forming pockets for the body portions of the bottles in upright position, the pockets $6^y$ being designed to receive the neck portions of bottles in inverted position.

Various other modifications of my inventive idea will naturally present themselves to those versed in the art to which this invention appertains, but I deem it unnecessary to further elaborate, as the principles of the invention and the resultant advantages are manifest.

I claim as my invention:—

1. The combination with a box, of a series of tapered posts located spaced apart therein, the sides of said posts forming pockets for receiving the bottles in upright position, while the edges of the posts form pockets for receiving bottles in inverted position.

2. The combination with a receptacle, of a series of tapered posts located spaced apart therein, the sides of said posts forming pockets for receiving bottles in upright position, while the edges of the posts form pockets for receiving bottles in inverted position, and bottle supporting rings extending around the pockets for the inverted bottles.

3. The combination with a box, of a series of tapered posts located spaced apart therein, the sides of said posts forming pockets for receiving the bottles in upright position, while the edges of the posts form pockets for receiving bottles in inverted position, and bottle supporting rings located at the top of the pockets for the inverted bottles.

4. The combination with a receptacle, of a frame therein formed of intersecting partitions, a series of uprights carried by the partitions intermediate the intersections thereof, whereby a series of pockets is formed by the sides of the uprights, and a second series by the edges of the uprights at the intersection of the partitions.

5. The combination with a receptacle, of a plurality of partitions or strips arranged in parallelism, a plurality of other strips arranged in parallelism and connected at right angles to the first mentioned strips, said strips being formed with engaging portions for the attachment of posts, tapered posts having their widened end portions engaged with the engaging portions of the partitions, whereby a plurality of pockets are formed by the sides of the posts to hold the bottles in upright position, and a plurality of pockets also formed by the edges of the posts in maintaining the bottles in inverted position.

6. The combination with a receptacle, of a plurality of partitions or strips arranged in parallelism, a plurality of other strips arranged in parallelism and connected at right angles to the first mentioned strips, all of said strips having engaging portions for the attachment of posts, tapered posts having their widened end portions engaged with the engaging portions of the partitions, whereby a plurality of pockets are formed by the sides of the posts to hold the bottles in upright position, a plurality of pockets also formed by the edges of the posts in maintaining the bottles in inverted position, and rings for the pockets holding the bottles in inverted position.

7. The combination with a receptacle, of a plurality of partitions or strips arranged in parallelism, a plurality of other strips arranged in parallelism and connected at right angles to the first mentioned strips, all of said strips having engaging portions for the attachment of posts, tapered posts having their widened end portions engaged with the engaging portions of the partitions whereby a plurality of pockets are formed by the sides of the posts to hold the bottles in upright position, a plurality of pockets also formed by the edges of the posts in maintaining the bottles in inverted position, and rings for the pockets holding the bottles in inverted position, each of said rings having a rounded edge.

8. A bottle holding rack including a series of posts located spaced apart therein, the sides of said posts forming pockets for receiving bottles in upright position while the edges of the posts form pockets for receiving bottles in inverted position.

9. A bottle holding rack including a plurality of posts located spaced apart therein, the sides of said posts forming pockets for receiving the bottles in upright position while the edges of the posts form pockets for receiving bottles in inverted position, and rings for the pockets holding the bottles in inverted position.

10. A bottle holding rack including a plurality of posts connected together in spaced apart relation to each other, the sides of said posts forming pockets for receiving the bottles in upright position, while the edges of the posts form pockets for receiving bottles in inverted position, and means located in said last named pockets for engaging and supporting said bottles as against lateral movement.

11. A bottle holding rack, including a plurality of posts connected together in spaced relation to each other, the sides of said posts forming pockets for receiving the bottles in upright positions, while the edges of the posts form pockets for receiving bottles in inverted position, and means associated with said last named pockets for engaging the shoulder portions of the bottles.

12. A bottle holding rack, including a plurality of posts connected together in spaced relation to each other, the sides of said posts forming pockets for receiving the bottles in upright position, while the edges of the posts form pockets for receiving bottles in inverted position, and means associated with said last named pockets for engaging the body portions of said bottles.

13. A bottle holding rack, including a plurality of posts disposed in spaced relation to each other, the sides of said posts forming pockets for receiving the bottles in upright position, while the edges of the posts form pockets for receiving bottles in inverted position, said posts being provided with upward extensions designed to support the body portions of the inverted bottles as against lateral movement.

14. A bottle holding rack, including a plurality of posts disposed in spaced relation to each other, the sides of said posts forming pockets for receiving the bottles in upright position, while the edges of the posts form pockets for receiving bottles in inverted position, said posts being provided with upward extensions designed to support the body portions of the inverted bottles as against lateral movement, and buffers carried by said extensions.

15. A bottle holding rack, including a plurality of posts disposed in spaced relation to each other, the sides of said posts forming pockets for receiving the bottles in upright position, while the edges of the posts form pockets for receiving bottles in inverted position, and cushions disposed in said last named pockets.

16. A bottle holding rack, including a plurality of posts disposed in spaced relation to each other, the sides of said posts forming pockets for receiving the bottles in upright position, and the edges of said posts forming pockets for receiving bottles in inverted position, and bottle supporting members bridging said last named pockets.

17. A bottle holding rack including a plurality of posts disposed in spaced relation to each other, the sides of said posts forming pockets for receiving bottles in upright position and the edges of said posts forming pockets for receiving bottles in inverted position, and members bridging the last named pockets and connected to said posts and provided with spring tongues extending into the pockets for the bottles in upright position.

18. A bottle holding rack including a plurality of posts disposed in spaced relation to each other, the sides of said posts forming pockets for receiving bottles in upright position, while the edges of said posts form pockets for receiving bottles in an inverted position, said posts being provided with upward extensions designed to support as against lateral displacement, the body portions of inverted bottles, members bridging the tops of the posts at the edges thereof, and designed to encircle the inverted bottles at the shoulder portions thereof, and other members bridging the posts at the edges thereof below the first named bridging members and secured to the posts.

19. A bottle holding rack including a plurality of posts disposed in spaced relation to each other, the sides of said posts forming pockets for receiving bottles in upright position, while the edges of said posts form pockets for receiving bottles in inverted position, said posts being provided with upward extensions designed to support, as against lateral displacement, the body portions of inverted bottles, members bridging the tops of the posts at the edges thereof and designed to encircle the inverted bottles at the shoulder portions thereof, and other members bridging the posts at the edges thereof below the first named bridging members and secured to the posts, the first named bridging members being provided with spring tongues extending into the pockets for the bottles in upright position.

20. A bottle holding rack, including a plurality of posts disposed in spaced relation to each other, the sides of said posts forming pockets for receiving the bottles in upright position and the edges of the posts forming pockets for the reception of bottles in inverted position, and rings bridging the pockets for the bottles in inverted position, said rings being formed with laterally projecting ears secured to the posts.

21. A bottle holding rack, including a plurality of posts arranged in spaced relation to each other, the sides of said posts forming pockets for receiving the bottles in upright position and the edges of said posts forming pockets for receiving bottles in inverted position, and a base frame for said posts, said frame comprising a plurality of strips arranged in parallelism to each other and another set of strips arranged in parallelism to each other and at right angles to the first mentioned strips, said strips extending across each other and formed with longitudinally extending side flanges forming channels receiving the lower ends of the posts.

22. A bottle holding rack, including a plurality of posts arranged in spaced relation to each other, the sides of said posts forming pockets for receiving the bottles in upright position, and the edges of said posts forming pockets for receiving bottles in inverted position, and a base frame for said posts, said frame comprising a plurality of strips arranged in parallelism to each other and another set of strips arranged in parallelism to each other and at right angles to the first mentioned strips, said strips extending across each other and formed with longitudinally extending side flanges forming channels receiving the lower ends of the posts, the flanges being secured to said posts.

23. A bottle holding rack, including a plurality of posts disposed in spaced relation to each other, the sides of said posts forming pockets to receive bottles in upright position and the edges of said posts forming pockets to receive bottles in inverted position, and a base frame for said posts, said frame comprising two sets of strips crossing each other and engaging the lower ends of the posts, said strips being formed with enlargements at their points of intersection.

24. A bottle holding rack, including a plurality of posts disposed in spaced relation to each other, the sides of said posts forming pockets for receiving bottles in upright position and the edges of said posts forming pockets for receiving bottles in inverted position, and a base frame for said posts, said frame comprising two sets of strips crossing each other, the strips being formed at their points of intersection with enlargements and at other points being formed with longitudinally extending laterally spaced side flanges receiving the lower ends of the posts.

25. A bottle holding rack, including a plurality of posts disposed in spaced relation to each other, the sides of said posts forming pockets for receiving the bottles in upright position and the edges of said posts forming pockets for receiving bottles in inverted position, and a base frame for said posts, said frame including two sets of interlacing strips connected to the lower ends of the posts.

26. In a receptacle for bottles, a rigidly held nesting means comprising a series of upright posts, means disposed centrally and transversely of said receptacle for supporting said posts, the edges of the posts forming pockets for receiving the necks of oppositely disposed sets of bottles, the sides of the posts forming pockets for receiving the body portions of other oppositely disposed sets of bottles, the bases of the last named bottles resting on said transverse supporting means.

27. In a receptacle for bottles, nesting means therein comprising a series of vertical members, means disposed horizontally of said receptacle and supporting said members, the upper and lower edges of said nesting means forming pockets for receiving the necks of bottles, and the central portion of said nesting means forming pockets for receiving the bodies of oppositely disposed sets of bottles.

In testimony whereof I affix my signature in presence of two witnesses.

ADOLPH H. SCHMEDTJE.

Witnesses:
C. SCHUMACHER,
HENRY HEIMBACHER.

Copies of this patent may be obtained for five cents each, by addressing the "Commissioner of Patents, Washington, D. C."